Sept. 23, 1969
G. B. BOUCHERIE
3,468,176
DEVICE FOR STEPWISE DISPLACEMENT OF
WORKPIECES, TOOLS AND SUCHLIKE
Filed April 25, 1967
2 Sheets-Sheet 1
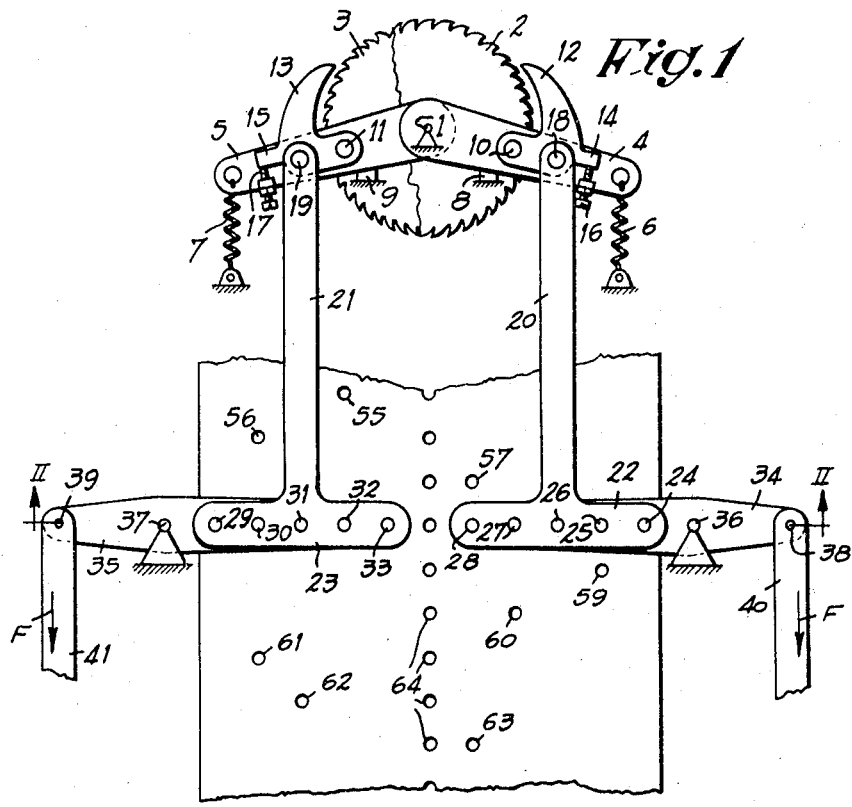
INVENTOR.
G. B. Boucherie
BY
Richards y Geier
ATTORNEYS Sept. 23, 1969  G. B. BOUCHERIE  3,468,176
DEVICE FOR STEPWISE DISPLACEMENT OF
WORKPIECES, TOOLS AND SUCHLIKE
Filed April 25, 1967  2 Sheets-Sheet 2
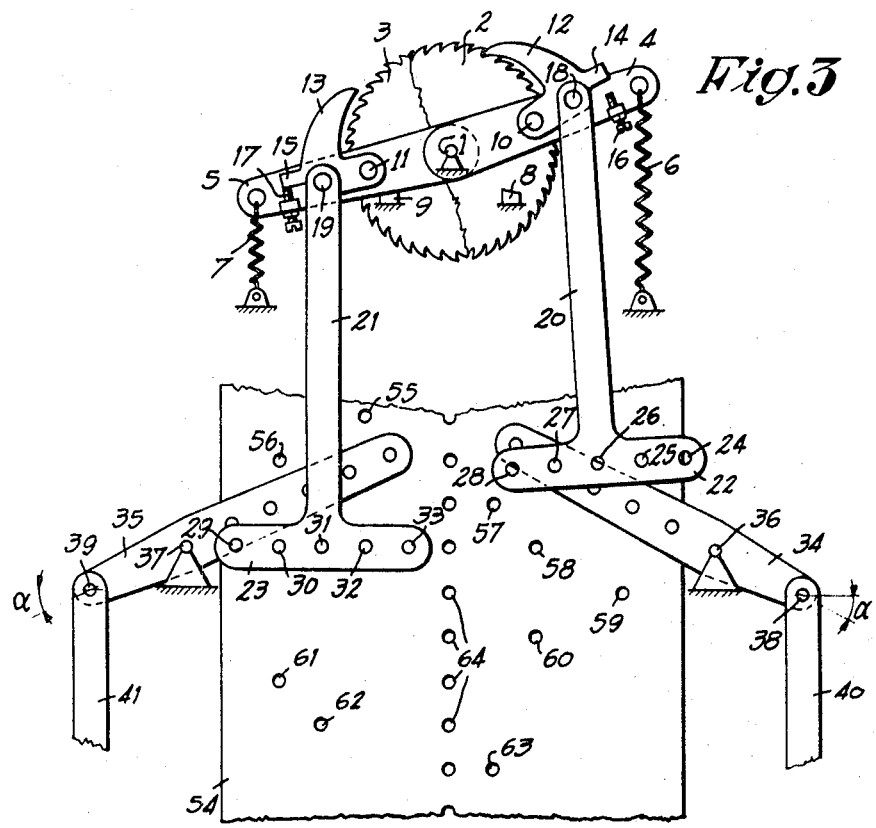
INVENTOR.
G. B. Boucherie
BY
Richards & Geier
ATTORNEYS

United States Patent Office 3,468,176
Patented Sept. 23, 1969

3,468,176
DEVICE FOR STEPWISE DISPLACEMENT OF WORKPIECES, TOOLS AND SUCHLIKE
Gerard Benoni Boucherie, Potaardestraat 1,
Rumbeke, Belgium
Filed Apr. 25, 1967, Ser. No. 638,179
Claims priority, application Belgium, Oct. 20, 1966,
46,157
Int. Cl. F16h 27/02, 31/00; G05g 1/00
U.S. Cl. 74—142                                    15 Claims

ABSTRACT OF THE DISCLOSURE

Workpieces, tools and the like are moved stepwise and correctly positioned by means of a perforated tape which actuates a workpiece driving shaft by means of ratchet wheels connected with the shaft. Pawls engage the ratchet wheels and are pivoted to linking arms provided with holes adapted to receive selective pins carried by rocking levers located close to the linking arms, whereby the perforations of the tape receive pins causing the required turning of the shaft.

---

The present invention concerns a device for the stepwise displacement of workpieces, tools or the like, more especially for the correct positioning of such workpieces, tools or the like, whereby the various stepwise displacements are controlled by means of a perforated tape.

It is a known fact that with many production machines the workpieces and/or the tools must be displaced stepwise with respect to each other and this in such way that between two successive displacements said workpiece and/or tool must be held long enough at a standstill for allowing the workpiece to be subjected to a given process which subsequently must be repeated on other parts thereof.

Devices are known which make it possible to displace the workpieces and/or the tools with respect to each other in a stepwise manner, for which purpose use is made either of expensive cams or intricate and expensive electronic control means.

The present invention concerns a mechanical device for the stepwise displacement of tools, workpieces or the like, whereby use is made of a perforated tape which in turn is being displaced stepwise in the known way.

A first advantage resulting from such a mechanical device, respectively mechanical positioning device, is that for each new pattern it is only necessary to replace said perforated tape, which costs very little, while the device as such is very simple, can be assembled from a minimum number of parts, is very reliable, in operation and at the same time very cheap to make.

Another advantage of the device according to the present invention is that no time is lost in changing because for each displacement the driving time on said axis or the like is equal to the time during which the driving element is displaced. The device according to the present invention, which has said and other advantages, mainly consists therefore in the combination of the following implements and devices, viz., an axis which can be displaced stepwise, and onto which at least one ratchet wheel is fastened; a pawl which can operate together with said ratchet wheel, whereby this pawl is hinged onto a lever rocking about the center of said ratchet wheel; a linking arm which is hinged to said pawl and is provided at the other end with a series of holes; a rocking lever which is mounted under said row of holes and is for instance controlled by a cam, whereby this rocking lever carries pins of which each one can operate separately with one of the holes of said row of holes for connecting the rocking lever to the connecting arm in which this row of holes is provided; means for controlling said pins and means which determine which one of them shall contribute to establish the connection corresponding to the amount of displacement of said ratchet wheel, respectively of said axis onto which the latter is fastened.

In order to indicate more clearly the characteristic features of the device according to the present invention, a description is given below, by way of example and without implying any limiting character, of a preferred form of embodiment in connection with the appended drawings of which:

FIGURE 1 is a top view of the device according to the present invention, in which however for clarity's sake, several parts have been omitted and in which the device is represented in a neutral stand;

FIGURE 2 is a view with partial cross-section in a plane of which the trace follows straight line II—II of FIGURE 1;

FIGURE 3 is a view similar to that of FIGURE 1, but representing the operational position;

FIGURE 4 is a view similar to that of FIGURE 2, whereby the device is represented at rest.

On an axis 1, onto which is fastened for instance the (non represented) working piece, a tool or the like item, are mounted two ratchet wheels 2-3 respectively, whereby these ratchet wheels carry respectively opposed series of teeth. About this same axis 1, levers 4-5 respectively are mounted so as to be able to turn freely, whereby these levers are connected toward their other free end to a spring 6-7 respectively, each of which is fastened to a fixed part of the machine. These levers 4-5 are pulled by said springs 6-7 against stops 8-9 respectively.

Onto the levers 4-5 and in a well defined point with respect to the axis 1 and/or with respect to the ratchet wheels 2-3, pivots, 10-11 respectively, are mounted carrying respectively pawls 12-13, whereby the latter can operate together with the corresponding ratchet wheels 2-3. Each of these pawls 12-13 carries an extension, 14-15 respectively, which can co-operate with adjustable stops, 16-17 respectively. The pawls 12-13 are connected in a hinged way via pivots 18-19 to connecting arms 20-21 each of which is provided near its lower end with a cross piece, 22-23 respectively, in which holes, 24-25-26-27-28 and 29-30-31-32-33 respectively, have been made at equal distances from each other.

Under each of the cross-pieces 22-23 of said connecting arms 20-21, there is a rocking lever 34-35, of which each one swings on fixed pivots 36-37 and is connected to rods 40-41 via pivots 38-39, whereby said rods 40-41 can for instance be controlled by a (non represented) cam mechanism or the like, in order to communicate a rocking motion to the rocking levers 34-35.

Each one of said levers 34-35 is provided with holes which, when said rocking levers 34-35 are in a neutral position, are situated co-axially with aforesaid holes 24 to 35, and whereby these holes have the same diameter as the latter. In these holes of rocking levers 34-35, pins 42-43-44-45-46 and 47-48-49-50-51 respectively are mounted, whereby each one of these pins 42 to 51 is provided with two peripheral grooves, namely an upper groove 52 and a lower groove 53, each of which can operate together with a ball (not shown) provided in the side of the rocking levers 34-35, and whereby said balls are spring-loaded in the direction of the corresponding pins 42 to 51.

The length of said pins 42 to 51 is such that it is exactly equal to the thickness of lever 34 or 35 to which is added the thickness of the cross-part 22 or 23 plus the distance between part 22 and lever 34 which is equal to the distance between part 23 and lever 35.

The perforated tape 54 passes under these pins 42 to 51 and is provided at predetermined places which correspond with the displacement of aforesaid axis 1, with holes 55-

56–57–58–59–60–61–62–63 respectively, and whereby this perforated tape is furthermore provided, in its centerline for instance, with a row of holes 64 capable of co-operating with a device which imparts a stepwise displacement to said perforated tape.

Finally, two plates, 65–66 respectively, are mounted under the perforated tape 54, which plates are connected together by vertical columns 67, whereby these columns 67 are extended upward and there connected together by means of a third horizontal plate 68. The columns 67 can slide in guides 69 which are rigidly fastened to the frame of the device.

Holes are provided in said plate 65, the diameter of such holes being approximately the same as that of the holes provided in aforesaid perforated tape 54 and of which the distances apart are exactly equal to the distances between holes 24 to 33 which are provided in aforesaid parts 22–23. Said holes provided in the plates 65 are traversed by pins, 70–71–72–73–74 and 75–76–77–78–79 respectively, whereby each one of these pins passes by its opposite end through holes which are provided in plate 66 and whereby each one of these pins 70 to 79 is fitted at a predetermined height with a collar 80, whereby springs 81 are provided between said collar and plate 66.

Finally, said upper plate 68 is provided with downwardly directed pins, 82–83–84–85–86 and 87–88–89–90–91 respectively, whereby the diameter of these pins is somewhat smaller than the diameter of said pins 42 to 51, while the mutual distance between pins 82 to 91 is equal to the mutual distance of the holes 24 to 33 provided in the parts 22–23.

It should be noticed that, when the device is in the neutral position illustrated in FIGURE 1, the holes 24 to 33 are respectively co-axial with the pins 42 to 51, the pins 70 to 79 and the pins 82 to 91.

The plates 65–66–68 by means of which said pins 70 to 79 and 82 to 91 are connected, are themselves connected with a (non represented) device which causes the resulting assembly to move stepwise up and down at the proper moment.

The operation of the device according to FIGURES 1 to 4 is extremely simple, viz.:

In FIGURES 1 and 2 the device is in the neutral position; in other words, the pins 42 to 51 are situated under corresponding co-axial holes 24 to 33, whereby the plates 65–66–68 are in their highest position.

In this position, pin 73 has, through the action of its spring 81, passed through the corresponding hole 58 which is provided in the perforated tape 54, whereby pin 45 of the rocking lever 34 is pushed upward until it has reached hole 27 of the crossport 22 of the connecting arm 20, which causes the latter to be hinged with aforesaid lever 34.

The maximum displacement of pin 73 is obtained by the presence of said collar 80, so that the top face of this pin is always flush with the bottom face of aforesaid lever 34. The same holds for the other pins 70 to 79 when they pass through a hole in the perforated tape.

Hence, it is only pin 73 which, in this case, passes through hole 58 provided in the perforated tape 54, whereas the other pins 70 to 79 which are loaded by their respective springs 81, press against the bottom face of perforated tape 54 so that, in this position, they can have no effect on the further operation of the device.

When the device has been brought into the position illustrated in FIGURES 1 and 2, a rocking motion is imparted to the levers 34–35 through the rods 40–41 in the direction of arrow F so that the levers 34–35 undergo an angular displacement equal to α.

Considering that in this case none of the pins 47 to 51 are connected to part 23 of the connecting arm 21, the rocking lever 35 moves freely without affecting at all said lever 21 and/or pawl 13 of the corresponding ratchet wheel 3, while by the connection which is obtained by pin 45 between the rocking lever 34 and the cross-part 22 of connecting arm 20, the latter is moved upward in such way that pawl 12 engages the corresponding ratchet wheel 2, whereby the latter, respectively shaft 1, is moved through a distance which is equal to four teeth.

In fact, the position of holes 24 to 33 is determined in such way with respect to the teeth of ratchet wheels 2–3 and with respect to the rocking motion of levers 34–35 that, when either lever 34 or 35 is connected with the cross-part 22 or 23 by means of pins 42 or 47, the corresponding ratchet wheel 2–3 moves by one tooth, whereas when this connection is obtained by means of pins 43 or 48, 44 or 49, 45 or 50, 46 or 51, the ratchet wheels 2 or 3 are respectively displaced by two teeth, three teeth, four teeth and five teeth.

When the levers 34–35 have come back into their neutral position as illustrated in FIGURES 1 and 2, the plates 65–66–68 are moved downward as illustrated in FIGURE 4, with the result that, on the one hand, pin 73 is pulled out of perforated tape 54 while the other pins 70 to 79 are moved away from the underside of said tape and whereby, on the other hand, pin 85 causes in this case the corresponding pin 45 to be pushed downward out of part 22, so that the connection which existed between lever 33 and this part 22 is eliminated.

In this position of FIGURE 1, the perforated tape 54 is moved by one step so that, in this case, hole 59 will come to lie under hole 25 of the cross-part 22.

When the plates 65–66–68 are moved upward again, pin 71 will penetrate through hole 59 and hence push pin 43 upward, thus establishing a connection between lever 34 and part 22, and this in such a manner that when levers 34–35 rock, ratchet wheel 2 will move through two teeth.

Hence, as one of the holes 60–61–62–63 etc. arrives under the corresponding hole 24 to 33, the corresponding pin 42 to 51 will establish a connection, either between rocking lever 34 and part 22, or between rocking-lever 35 and part 23 in order to rotate shaft 1 through a predetermined distance in the required direction which corresponds with the predetermined configuration of the pattern to be followed.

It is evident of course that the workpiece, tool or the like to be displaced can either be fastened straightway to the shaft or that shaft 1 can be used as driving means for displacing said workpiece, tool or the like via an appropriate mechanical transmission.

When successively displacing the perforated tape 54, whenever hole 60 provides passage to pin 73, ratchet wheel 2 is once again displaced by four teeth, after which successively, when the holes 61–62–63 come under the corresponding cross-piece 22–23, ratchet wheel 3 is displaced two teeth and subsequently three teeth, after which ratchet wheel 2 is moved five teeth in the other direction.

In the form of embodiment chosen as example, five holes are provided in the cross-pieces 22–23, so that the maximum displacement of the ratchet wheel 2–3 is equal to five teeth. Nothing prevents however to increase this number of teeth for obtaining a larger displacement of the shaft 1.

It will for instance be possible to apply the device conforming to the present invention in the manufacturing of brushes in order to displace the latter successively in different positions corresponding to the drilling of the holes, respectively to the application of a tuft of hair, fibre or the like into the body of the brush.

In the example which has been described above, a device has been dealt with for the stepwise displacement in two which are mutually opposed, or in other words a device by means of which the stepwise displacements take place along a single coordinate. Nothing prevents however such device to be provided for the stepwise displacement of workpieces or the like along two or three coordinates.

The present invention is in no way limited to the form of embodiment which has been described above, but the latter can be made in all kinds of sizes and shapes without exceeding the scope of the invention.

What I claim is:

1. In a device for the stepwise displacement of workpieces, tools or the like, the combination of a shaft which can be displaced stepwise, at least one ratchet wheel fastened to said shaft, a pawl which can operate together with said ratchet wheel, a lever rocking about the center of said ratchet wheel, said pawl being hinged to said lever, a linking arm which is hinged to said pawl and is provided at the other end with a row of holes, a rocking lever which is mounted under said row of holes, means controlling said rocking lever, a plurality of pins carried by said rocking lever of which each one can operate separately with one of the holes of said row of holes for connecting the rocking lever to the connecting arm in which this row of holes is provided; means for controlling said pins and means which determine which pin shall contribute to establish the connection corresponding to the amount of required displacement of said ratchet wheel and of said shaft to which the latter is fastened.

2. In a device for the stepwise displacement of workpieces, tools and the like, the combination of an axis which can be displaced stepwise, two ratchet wheels fastened to said axis; two pawls of which each one co-operates with one of aforesaid ratchet wheels, two levers which are fastened to said stepwise displaceable axis, said pawls being hinged to said levers; two connecting arms of which each one is hinged to one of aforesaid pawls and the second free end of which is provided with a row of holes; a rocking lever which is mounted under each one of said row of holes, means controlling said rocking levers, pins upon said rocking levers, each of said pins operating separately with one of the holes of said row of holes for connecting one of the rocking levers to the corresponding lever in which the row of holes is provided; means for controlling said pins and means which determine which one of the latter shall establish the connection between one of the rocking levers and the corresponding lever in which the row of holes is provided according to the amplitude of the desired displacement of one of the ratchet wheels and of said axis onto which said ratchet wheels are fastened.

3. Device according to claim 2, wherein the row of holes is provided in a cross-part of said corresponding connecting arm.

4. Device according to claim 2, comprising a spring and a fixed top, the lever onto which a pawl is fastened being connected with said spring which constantly urges this lever toward said fixed stop.

5. Device according to claim 2, comprising an adjustable stop, whereby each pawl is provided with a part which co-operates with said adjustable stop and whereby the latter is mounted onto the lever which carries the pawl.

6. Device according to claim 3, comprising a rocking lever hingedly mounted at a point situated outside of said cross-part and located under the cross-part in which said row of holes is provided.

7. A device according to claim 3, wherein said pins are somewhat longer than the thickness of the lever, whereby in the neutral position of the device, the pins are placed coaxially with the holes provided in the upwards cross-part.

8. Device according to claim 7, wherein the outside diameter of said pins is equal to the diameter of the holes in the cross-part.

9. Device according to claim 8, wherein said pins can be locked in two positions, which purpose they are provided for with two peripheral grooves.

10. Device according to claim 3, comprising a vertically reciprocable frame provided around said rocking lever and the cross-part, two rows of pins upon said frame of which a first row of fixed pins is placed in said cross-parts and a second row of moveable pins is mounted under said rocking lever, whereby in the neutral position of the device, all said rows of pins and holes are coaxially arranged.

11. Device according to claim 10, wherein the length and diameter of said rows of fixed pins are such that the latter can penetrate through the holes of the corresponding cross-part in order to move the pins of the corresponding rocking lever into their lower limiting position when the moveable frame is in its lowest position.

12. Device according to claim 10, comprising a collar for said second row of moveable pins which determines their highest position, and a spring between said collar and the moveable frame which constantly urges the pin toward said rocking lever.

13. Device according to claim 12, wherein the length of the second row of moveable pins is such that, in the highest position of the moveable frame, they bring the pins of the rocking lever into the upper locked position.

14. Device according to claim 10, comprising a perforated tape between the pins of the rocking lever and the second row of moveable pins which moves stepwise, whereby at each displacement of this perforated tape a hole is provided therein of which the diameter is at least equal to the diameter of the pins in said second row, whereby the passage of the pin of said second row passing through the hole of the perforated tape determines which pin of the rocking lever shall establish a connection between the latter and the cross-piece above.

15. Device according to claim 10, wherein said rocking lever has a constant angular displacement.

References Cited

UNITED STATES PATENTS

| | | | |
|---|---|---|---|
| 2,572,609 | 10/1951 | Gierwiatowski | 74—479 |
| 2,852,727 | 9/1958 | Barnett. | |
| 3,006,174 | 10/1961 | Haddad | 74—568 XR |
| 3,013,445 | 12/1961 | Enssle | 74—568 |

FOREIGN PATENTS 8,450    1910    Great Britain.

FRED C. MATTERN, JR., Primary Examiner

MANUEL ANTONAKAS, Assistant Examiner

U.S. Cl. X.R.

74—577